(12) United States Patent
Brimeyer et al.

(10) Patent No.: US 11,516,964 B2
(45) Date of Patent: Dec. 6, 2022

(54) POSITION CONTROLLED GAUGE WHEELS ON A HARVESTING MACHINE HEADER THAT MOVE WITH A FEEDER HOUSE MOVE COMMAND

(71) Applicant: Deere & Company, Moline, IL (US)

(72) Inventors: Alex Brimeyer, Bettendorf, IA (US); Benjamin M. Lovett, Colona, IL (US); Bryan R. Yanke, Eldridge, IA (US); Duane M. Bomleny, Geneseo, IL (US); David Barto, Moline, IL (US); Daniel R. Marunde, Moline, IL (US)

(73) Assignee: Deere & Company, Moline, IL (US)

( * ) Notice: Subject to any disclaimer, the term of this patent is extended or adjusted under 35 U.S.C. 154(b) by 788 days.

(21) Appl. No.: 16/398,785

(22) Filed: Apr. 30, 2019

(65) Prior Publication Data
US 2020/0344950 A1 Nov. 5, 2020

(51) Int. Cl.
*A01D 41/14* (2006.01)

(52) U.S. Cl.
CPC .......... *A01D 41/141* (2013.01); *A01D 41/145* (2013.01)

(58) Field of Classification Search
CPC ...... A01D 47/00; A01D 41/14; A01D 41/141; A01D 41/145; A01D 67/00
See application file for complete search history.

(56) References Cited

U.S. PATENT DOCUMENTS

| 3,408,802 | A | 11/1968 | Slates et al. | |
|---|---|---|---|---|
| 6,758,029 | B2 | 7/2004 | Beaujot | |
| 6,789,379 | B2 * | 9/2004 | Heidjann | A01D 41/12 56/10.2 E |
| 7,191,582 | B2 * | 3/2007 | Bomleny | A01D 41/141 56/10.2 E |
| 8,245,489 | B2 * | 8/2012 | Talbot | A01D 41/141 56/15.8 |
| 9,148,998 | B2 * | 10/2015 | Bollin | A01D 41/127 |
| 10,278,330 | B2 * | 5/2019 | Silver | A01F 12/18 |
| 11,246,259 | B2 * | 2/2022 | Yanke | A01D 34/283 |
| 2006/0254232 | A1 * | 11/2006 | Bomleny | A01D 41/141 56/10.2 E |

FOREIGN PATENT DOCUMENTS

| CA | 2540783 A1 * | 11/2006 | ......... A01D 41/141 |
|---|---|---|---|
| CA | 2665589 A1 * | 11/2010 | ......... A01D 41/141 |
| CA | 3079457 A1 * | 10/2020 | ......... A01D 41/141 |
| EP | 3243372 A1 | 11/2017 | |

* cited by examiner

*Primary Examiner* — Thomas B Will
*Assistant Examiner* — Joan D Misa
(74) *Attorney, Agent, or Firm* — Joseph R. Kelly; Kelly, Holt & Christenson PLLC

(57) ABSTRACT

A header has a position controlled gauge wheel that is controlled using a position actuator. The position actuator is locked when the gauge wheel is in a selected position, relative to a mainframe of the header. An operator input, changing the position of the header, is detected and the position actuator is unlocked to accommodate movement of the header, based on the detected operator input signal.

19 Claims, 5 Drawing Sheets

US 11,516,964 B2

POSITION CONTROLLED GAUGE WHEELS ON A HARVESTING MACHINE HEADER THAT MOVE WITH A FEEDER HOUSE MOVE COMMAND

FIELD OF THE DESCRIPTION

The present description relates to agricultural equipment. More specifically, the present description relates to controlling the position of gauge wheels on the header of an agricultural harvester.

BACKGROUND

There is a wide variety different types of agricultural equipment. Some such equipment includes agricultural harvesters.

It is common for agricultural harvesters (such as combine harvesters, forage harvesters, windrowers, etc.) to have a header. On a combine, the header is attached to a feeder house by an attachment frame. The mainframe is movable relative to the attachment frame. The header has a header mainframe that supports a cutter bar and a reel. As the harvester travels, the header engages crop, severs it and transfers the crop into the harvester for further processing.

The feeder house can be pivotally attached to the agricultural harvester, and a feeder house control cylinder can also be attached to the feeder house. Actuation of the feeder house control cylinder can raise and lower the feeder house (and thus the header) relative to the harvester, and thus relative to the ground.

On a windrower, the header has a header mainframe and a cutter that are movably attached to a traction unit. A lift cylinder is actuated to raise and lower the header mainframe and cutter relative to the traction unit, and thus relative to the ground.

The header mainframe can also be pivotally attached to the combine or traction unit. This allows the header to be tilted, using a tilt actuator, such as a tilt cylinder.

The header can be in different forms. For instance, it can have a relatively solid floor that receives severed crop, after it is cut by the cutter. The crop is then moved toward the center of the harvesting machine by an auger. Once at the center of the machine, it is feed into the machine, through the feeder house.

Another type of header is similar, except that it has a flexible floor with a pair of draper belts. The crop, once it is severed by the cutter, falls onto the draper belts which move the crop towards the center of the machine where they enter the machine through the feeder house.

Both of these types of headers can be supported by gauge wheels. Gauge wheels are often pivotally supported to the header, and the position of a gauge wheel, relative to the header, is often maintained by a bias member, which can be a hydraulic cylinder, a spring, etc.

The position of the gauge wheels can be controlled in a variety of different ways. In one example, the position of the gauge wheels is controlled using a pressure control mechanism in which pressure is applied to the gauge wheels, from the header. For instance, the pressure may be applied by a hydraulic cylinder or a spring. The amount of pressure applied can be a varied by varying the hydraulic pressure applied, or by varying the spring tension.

In another example, the position of the gauge wheels, relative the header, is controlled using a position control mechanism. In that case, a hydraulic cylinder is used to establish a desired position of the gauge wheels, relative to the header. Once that position is established, the hydraulic cylinders are illustratively locked so that they act as a solid beam, thus supporting the gauge wheels in the desired position relative to the header. As the harvester moves along the field, the gauge wheels thus support the header at a fixed position above the ground.

The discussion above is merely provided for general background information and is not intended to be used as an aid in determining the scope of the claimed subject matter.

SUMMARY

A header has a position controlled gauge wheel that is controlled using a position actuator. The position actuator is locked when the gauge wheel is in a selected position, relative to a mainframe of the header. An operator input, changing the position of the header, is detected and the position actuator is unlocked to accommodate movement of the header, based on the detected operator input signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
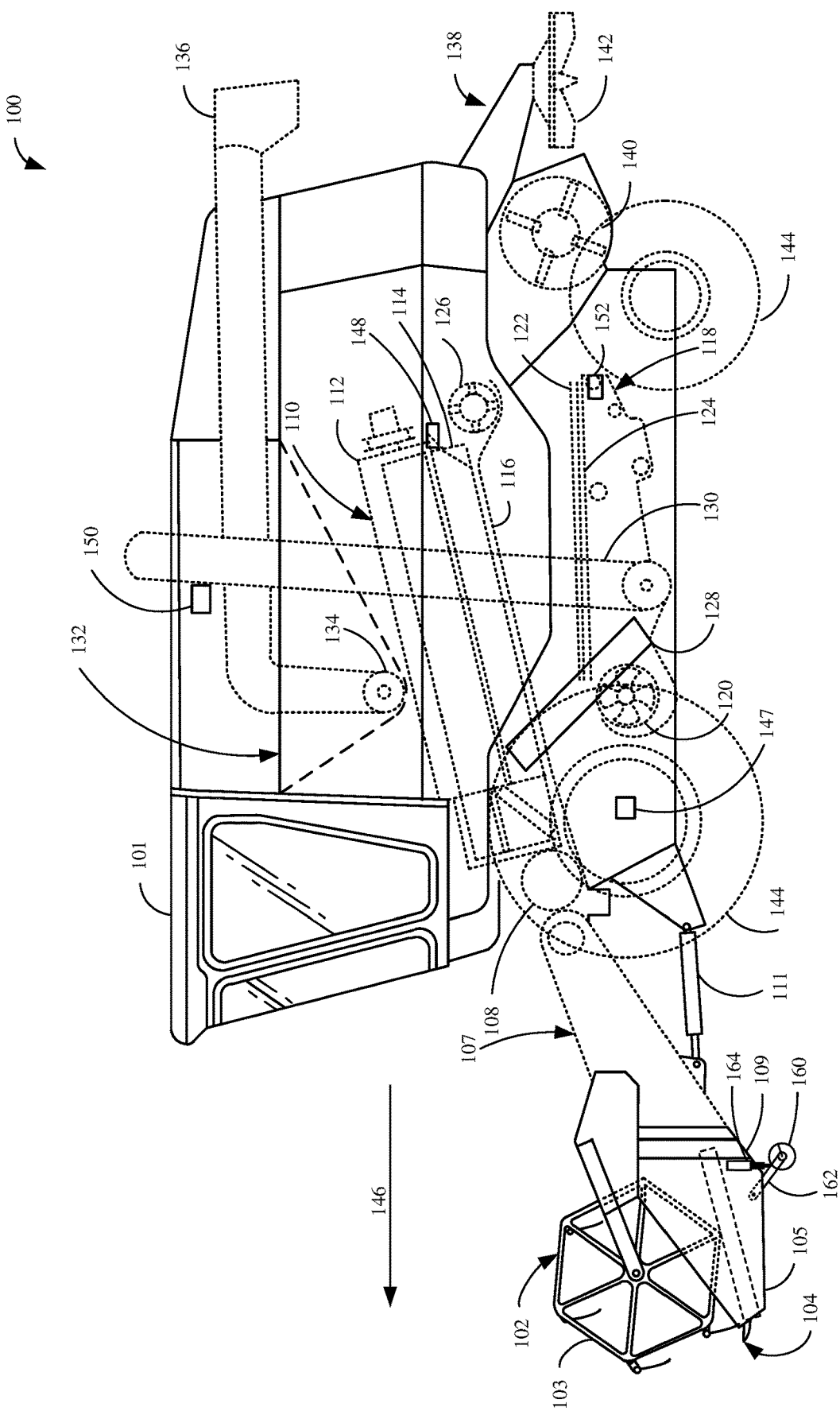
FIG. 1 is a partial pictorial, partial schematic view of a combine harvester.

As discussed above, harvester headers have a header mainframe that supports the header structure, and an attachment frame. The header mainframe is movably attached to the attachment frame. The header mainframe is attached to the feeder house using an attachment mechanism on the attachment frame that cooperates with an attachment mechanism on the feeder house.

Also, as discussed above, gauge wheels can disposed on a harvesting machine header in order to support the header at a desired position above the ground. Some gauge wheels are position controlled gauge wheels. This means that hydraulic cylinders, that are used to position the gauge wheels relative to the header, are locked, once a desired gauge wheel position is reached. The cylinders thus act like a solid beam. This can present difficulties.

As an example, it may be that an operator wishes to lower the cutter bar. For instance, it may be that the harvester is entering position in the field where the crop is down. The operator may thus wish to lower the cutter bar in order to harvest the downed crop more effectively. In that case, the operator will illustratively provide an input, through an operator input mechanism, in order to actuate the cylinder, that controls the position of the feeder house relative to the frame of the harvesting machine, to lower the feeder house and thus the header. This can cause the feeder house to move downward, but the cutter bar to stay in the same position relative to the ground.

The reason is that when an operator wishes to lower the cutter bar, the operator provides a feeder house down command. This causes the feeder house to move downwardly. However, because the gauge wheels are locked in position, the cutter bar does not move downwardly. Instead, the attachment frame moves downwardly, under the influence of the downwardly moving feeder house, relative to the header mainframe, until the attachment frame hits a mechanical bottom stop which limits movement of the attachment frame relative to the header mainframe. This happens while the cutter bar remains in the same position relative to the ground. If the operator keeps providing the feeder house down command, the attachment frame will continue pushing downward on mechanical stop on the header mainframe and thus increase the load on the gauge wheels, because they will not be moving relative to the header mainframe. This can be problematic for a number of different reasons.

It can unduly increase the load on the gauge wheels, and the mechanisms that are used to attach the gauge wheels to the header mainframe. This can cause damage or accelerated wear. Also, this experience does not match what the operator expects. When the operator provides an operator input commanding the feeder house and header to be lowered, the operator then expects that the cutter bar will move downward relative to the ground.

The present description thus describes a system in which the position controlled gauge wheels are either controlled to move, or are allowed to move, relative to the header mainframe in response to an operator input that changes the feeder house position. For example, when the operator provides a feeder house down command, the cylinder that is holding the position-controlled gauge wheels in position is controlled so that the gauge wheels can retract, thus allowing the cutter bar to move closer to ground, as the operator expects.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 107, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 107 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Header 102 has a mainframe 105 and an attachment frame 109. Header 102 is attached to feeder house 107 by an attachment mechanism on attachment frame 109 that cooperates with an attachment mechanism on feeder house 107. Mainframe 105 supports cutter 104 and reel 103 and is movable relative to attachment frame 109. In one example, mainframe 105 and attachment frame 109 can be raised and lowered together by actuating cylinder 111, which raises and lowers feeder house 107, to set a height of cutter 104 above the ground over which combine 100 is traveling. In another example, mainframe 105 can be tilted relative to attachment frame 109 to adjust a tilt angle with which cutter 104 engages the crop. Also, in one example, mainframe 105 can be rotated or otherwise movable relative to attachment frame 109 in order to improve ground following performance. The movement of mainframe 105 together with attachment frame 109 can be driven by actuators (such as hydraulic actuators) based on operator inputs or automated inputs.

In the example shown in FIG. 1, header 102 can also have a set of gauge wheels 160. Gauge wheels 160 are illustratively pivotally attached to the header mainframe 105 of header 102 by linkage (or positioner arm) 162. The position of gauge wheel 160 relative to mainframe 105 can be set using an actuator (such as hydraulic cylinder 164). In an example where the gauge wheels 160 are position controlled, the operator first sets a position of the cutter 104 relative to the ground over which harvester 100 is traveling. The operator then sets the position of the gauge wheels 160 so that they support header 102 at the current position. The position of gauge wheels 160 relative to mainframe 105 is set by actuating, or allowing movement of, cylinder 164. When the gauge wheels 160 are in the desired position relative to mainframe 105, the cylinder 164 is locked in place. In such an example, cylinder 164 acts a solid beam so that the position of gauge wheel 160 relative to mainframe 105 does not change.

It will be appreciated that the present discussion proceeds with respect to header 102 having gauge wheels 160. However, it can have different ground engaging elements, such as one or more skids or track assemblies, as well. Also, the present discussion proceeds with respect to actuator 164 being a hydraulic cylinder. However, it can be a different type of actuator, such as a rotational actuator or another type of position actuator that is coupled to the ground engaging elements so that when the actuator moves in a first direction, it drives movement of the ground engaging elements in one direction relative to the header 102 (e.g., downward) and when the actuator moves in a second direction, it drives movement of the ground engaging elements in another direction relative to the header 102 (e.g., upward).

In operation, and by way of overview, the height of header 102 is set and combine 100 illustratively moves through a field in the direction indicated by arrow 146. As it moves, header 102 engages the crop to be harvested and gathers it toward cutter 104. After it is cut, the crop can be engaged by reel 103 that moves the crop to feeding tracks or augers (not shown). The feeding tracks or augers move the crop to the center of the header 102 and then through a center feeding mechanism in feeder house 107 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

In one example, combine 100 has a tailings system where tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

As combine 100 moves in the direction indicated by arrow 146, it may be that the ground under header 102 contains obstacles or is uneven. Header 102 is thus provided with ground engaging elements (such as gauge wheels 160) that engage the surface of the ground over which combine 100 is traveling. Combine 100 can also be provided with a float force assembly (not shown) that applies a float force, that is illustratively a lifting force that acts against gravity, biasing mainframe 105 of header 102 in an upward direction relative to attachment frame 109. Therefore, as the ground under header 102 rises, the gauge wheels 160 on header 102 engage the rising ground surface and push upwardly on mainframe 105. The float force applied by the float force assembly assists in raising header 102 up to follow the rising ground surface. In areas where the ground falls off, the weight of header 102 overcomes the float force so that it descends to its ground following set point or to a point where the gauge wheels 160 again engage the surface of the ground.

It may be that the operator of harvester 100 enters a region of the field where the operator wishes to lower the cutter bar (or cutter) 104 relative to the ground surface. For instance, where the crop being harvested is downed, it may be beneficial to lower to cutter bar 104 to better engage the downed crop for more efficient harvesting. In order to do that, the operator illustratively provides an operator input which causes cylinder 111 to lower feeder house 107. However, because cylinder 164 (that is holding gauge wheels 160 in their position relative to mainframe 105) acts as a solid beam, this will cause the attachment frame 109 to move downwardly relative to the mainframe 105 through its entire range of motion. In one example, this range of motion may be three to six inches. Once the attachment frame has moved down to its extreme lower end of motion relative to mainframe 105, it will engage a mechanical stop. Thus, at this point, though the feeder house 107 has been lowered, the cutter bar 104 has remained in its same position relative to the ground.

If the operator continues to provide the input to lower feeder house 107, then the attachment frame 109 will push down on the mechanical stop on the mainframe 105, and this will exert a greater load on gauge wheels 160, but cutter bar 104 will still not move. This can cause increased wear or damage to gauge wheels 160 or the assembly used to mount them to mainframe 105. It is also a response that is not expected by the operator or harvester 100. Instead, when the operator lowers feeder house 107, the operator expects that the cutter bar will also be lowered relative to the ground.

Figure 2:
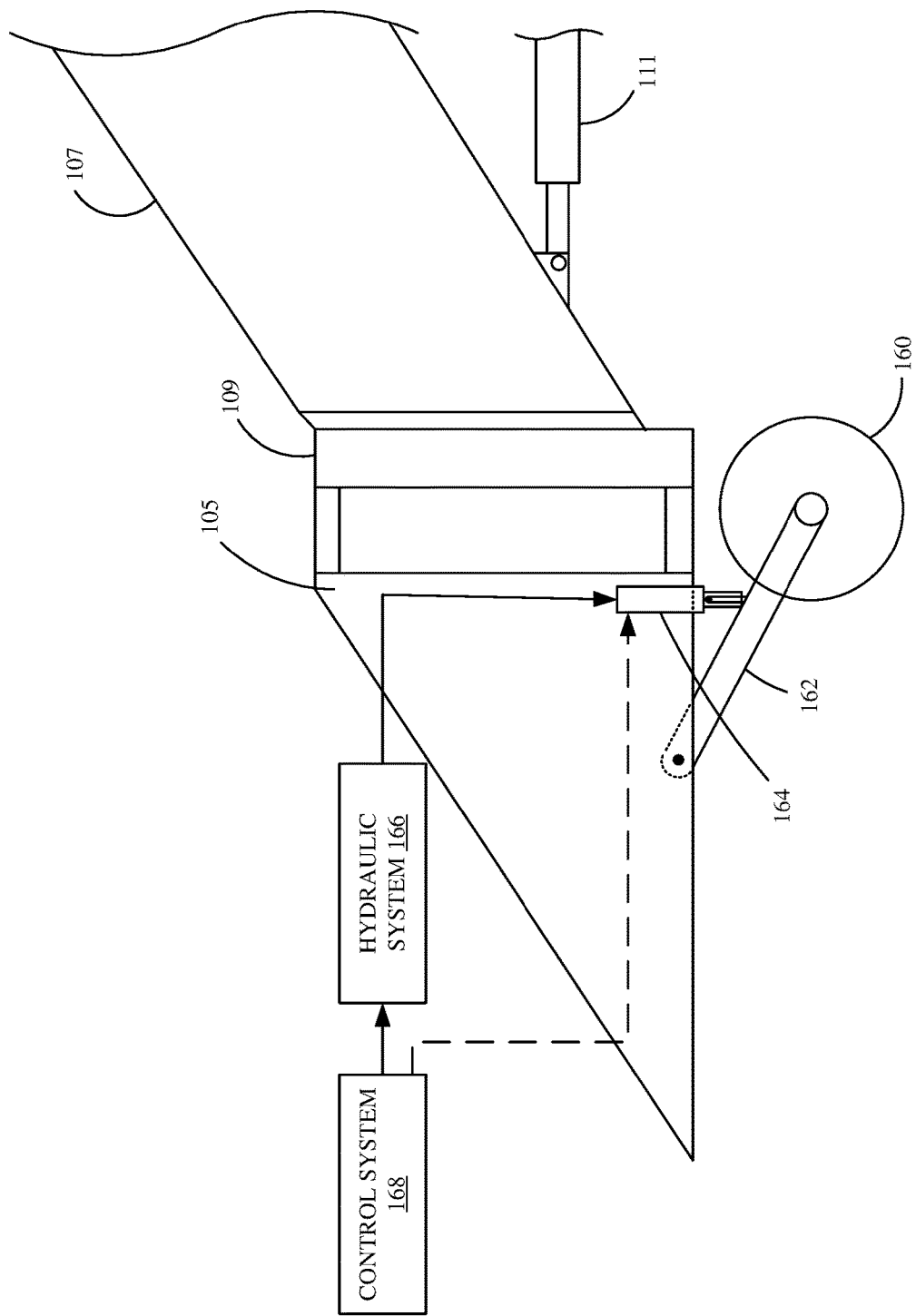
FIG. 2 shows a representation of the header and feeder house, along with a gauge wheel.

FIG. 2 is a simplified illustration of some portions of the combine harvester 100 illustrated in FIG. 1. Some of the items are similar to those shown in FIG. 1, and they are similarly numbered. FIG. 2, however, shows a block diagram of a hydraulic system 166 and a control system 168. Hydraulic system 166 illustratively provides hydraulic fluid under pressure to hydraulic cylinder 164. Also, when gauge wheel 160 is in its desired position relative to header mainframe 105, hydraulic system 166 locks cylinder 164 so that it acts as a solid beam against linkage 162, thus holding gauge wheel 160 in its position relative to header mainframe 105.

FIG. 2 also shows that control system 168 can provide a control signal to hydraulic system 166 and/or hydraulic cylinder 164. Control system 168 illustratively detects when the operator provides a feeder house movement command, through an operator interface mechanism, to move feeder house 107 up or down by actuating cylinder 111 (or another actuator). In that case, control system 168 generates a control signal and provides it either to hydraulic system 166 or to cylinder 164, or both, which allow cylinder 164 to move in response to that feeder house movement command. By way of example, where the operator provides a feeder house down command to lower feeder house 107 relative to the ground, control system 168 detects this and provides a control signal that unlocks cylinder 164 so that it can retract. This allows gauge wheel 160 to move upwardly relative to the header mainframe 105 when feeder house 107 is moving downwardly. This effectively lowers the cutter bar 104 relative to the surface of the ground. In one example, control system 168 actively controls cylinder 164 to positively retract. In another example, control system 168 simply unlocks control system 164 so that it retracts under the weight of header 102 and the down pressure exerted by feeder house 107 as it moves downwardly. Both of these and other examples are contemplated herein.

In addition, it may be that, instead of locking and unlocking a cylinder, control system 168 can generate control signals to actuate an actuator in a different way. For example, instead of "locking" a cylinder in place, control system 168 can generate control signals to actuate an actuator to increase resistance to (e.g., inhibit) upward movement of gauge wheels 160 (or another ground engaging element) relative to header 102. Similarly, instead of "unlocking" cylinder 164, control system 168 may generate control signals to decrease the resistance to upward movement of gauge wheels 160 (or another ground engaging element) relative to header 102. Locking and unlocking will be discussed below, but this is by way of example only, and controlling an actuator to inhibit movement, (e.g., increase resistance to movement) and reduce resistance to movement, are contemplated herein as well.

Figure 3:
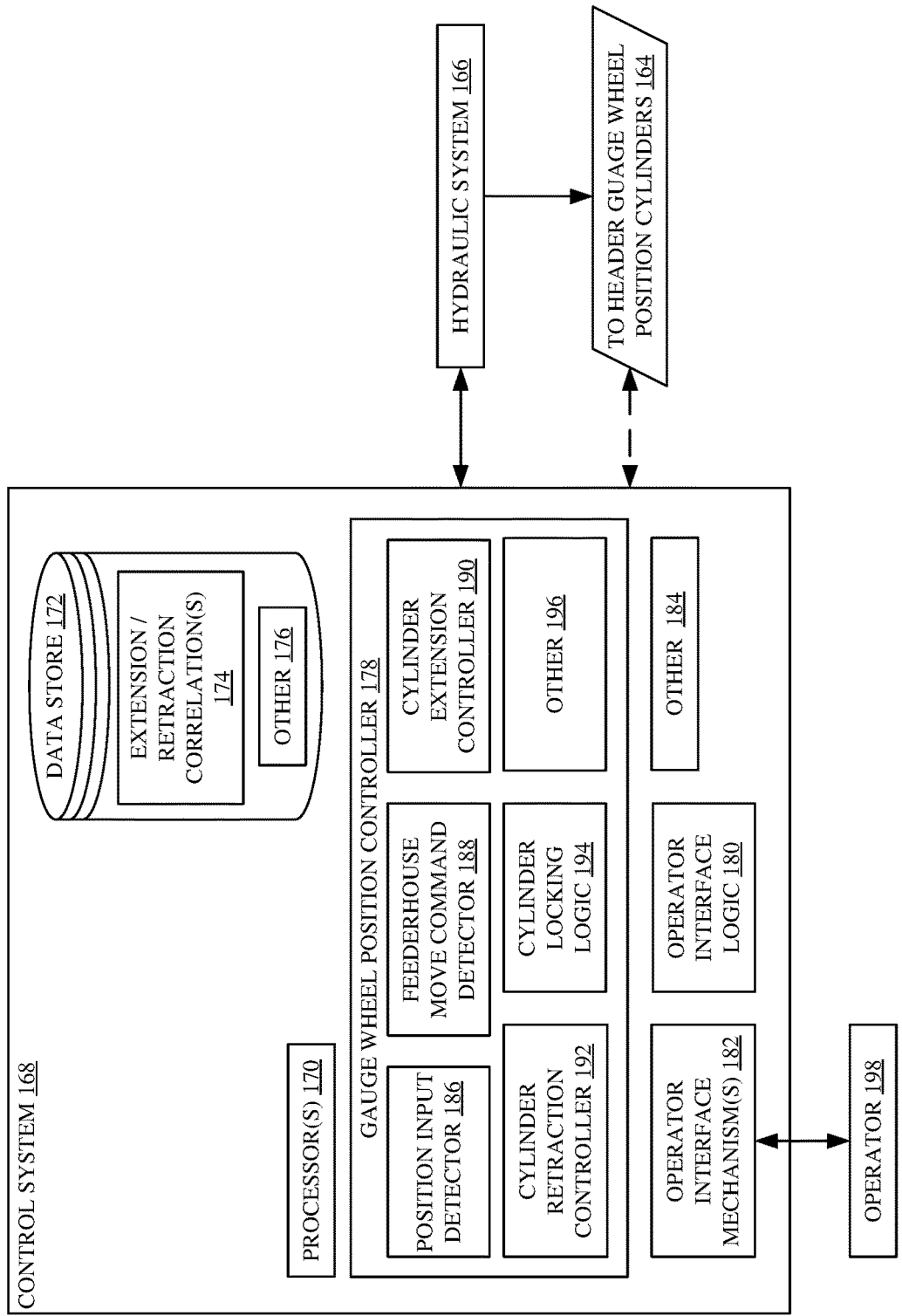
FIG. 3 is a block diagram showing one example of a control system that can be used to control gauge wheel position.

FIG. 3 is a block diagram showing one example of control system 168, in more detail. Some items shown in FIG. 3 are similar to those shown in the previous FIGS., and they are similarly numbered.

In the example shown in FIG. 3, control system 168 illustratively includes one or more processors 170, data store 172 (which, itself, can include extension/retraction correlations 174 and other items 176), gauge wheel position controller 178, operator interface logic 180, operator interface mechanisms 182, and it can include other items 184. FIG. 1 also shows that, in one example, gauge wheel position controller 178 illustratively includes position input detector 186, feeder house move command detector 188, cylinder extension controller 190, cylinder retraction controller 192, cylinder locking logic 194, and it can include other items 196.

FIG. 3 also shows that operator 198 can interact with control system 168 through operator interface mechanisms 182. Those mechanisms can include a wide variety of different types of mechanisms, such as joysticks, steering wheel, levers, pedals, buttons, actuators on a display screen that can be actuated using a point and click device, a microphone and speaker where speech recognition functionality is provided, a touch sensitive display screen where touch gestures can be processed, among a wide variety of other operator interface mechanisms. Control system 168 can provide a control outputs to hydraulic system 166 and/or directly to header gauge wheel position cylinders 164.

Before describing the overall operation of control system 168, a brief description of some of the items in control system 168, and their operation, will first be provided. Gauge wheel position controller 178 illustratively generates control signals that can be used to control the position of gauge wheel 160 using actuator 164. Position input detector 186 illustratively detects a user input indicating that a desired gauge wheel position has been reached. For instance, once operator 198 moves header 102 to its desired position, relative to the ground, and gauge wheels 160 are in contact with the ground, then this can be detected by position input detector 186. This can be detected based on an express operator input indicating that the position has been reached, or it can be derived from another input. For instance, when the user actuates cylinder 111 to move feeder house 107, and then stops actuating cylinder 111, and once gauge wheels are in contact with the ground, this may be treated as an indication that the final gauge wheel position has been reached.

Feeder house move command detector 188 detects when operator 198 commands the feeder house 107 to move. In one example, it can detect both upward and downward movement commands. In another example, it detects when operator 198 provides an input to move feeder house 107 downward. Cylinder extension controller 190 illustratively generates a control signal causing (or allowing) actuator 164 to extend. Cylinder retraction controller 192 illustratively generates a control signal that causes (or allows) cylinder 164 to retract. The control signals can be provided to hydraulic system 166 where cylinder 164 is controlled hydraulically. In another example, they can be provided directly to cylinder 164, or to a separate circuit, where cylinder 164 is controlled electronically.

Cylinder locking logic 194 determines when cylinder 164 should be locked. For example, when header 102 is in a desired position relative to the ground, and when gauge wheels 160 are in contact with the ground, then cylinder 164 can be locked so that it acts as a ridged beam, holding gauge wheels 160 in a current position, relative to header mainframe 105.

In one example, when the operator provides an input to move feeder house 107 down, and when cylinder locking logic 194 has locked cylinder 164, the feeder house down command is detected by detector 188. Cylinder retraction controller 192 then generates a control signal to control cylinder 164 so that it retracts, as feeder house 107 moves downwardly. In one example, cylinder retraction controller 192 can control cylinder locking logic 194 to unlock cylinder 164, so that it can retract under the weight of header 102, and the down pressure exerted by feeder house 107. In another example, cylinder retraction controller 192 controls cylinder locking logic 194 to unlock cylinder 164, and controller 192 actively drives cylinder 164 to retract.

In one example, it can actively drive cylinder 164 at a variety of different rates. In that case, it can access data store 172 which includes extension/retraction correlations 174. Those correlations 174 may indicate how quickly cylinder 164 is to extend or retract, based upon the movement of feeder house 107 (or the control input from operator 198 that is commanding movement of feeder house 107). For instance, if operator 198 is providing a small input so that the operator is moving feeder house 107 down relatively slowly, then this can be sensed and correlations 174 may indicate that cylinder 164 should be retracted relatively slowly, so that gauge wheel 160 continues to support header 102 as it is lowered, but does not bear significant additional load based on the downward movement of feeder house 107. However, when the operator input is moving feeder house 107 down rapidly, then this can be sensed and correlations 174 can indicate that cylinder 164 should be retracted rapidly. Correlations 174 can correlate the extension and retraction of cylinder 164 to the movement or inputs commanding movement of feeder house 107 in a variety of other ways as well.

Operator interface logic 180 illustratively detects operator interactions through operator interface mechanisms 182. It can generate outputs through mechanisms 182 and detect inputs as well. It can communicate those inputs to other items in control system 168.

Figure 4:
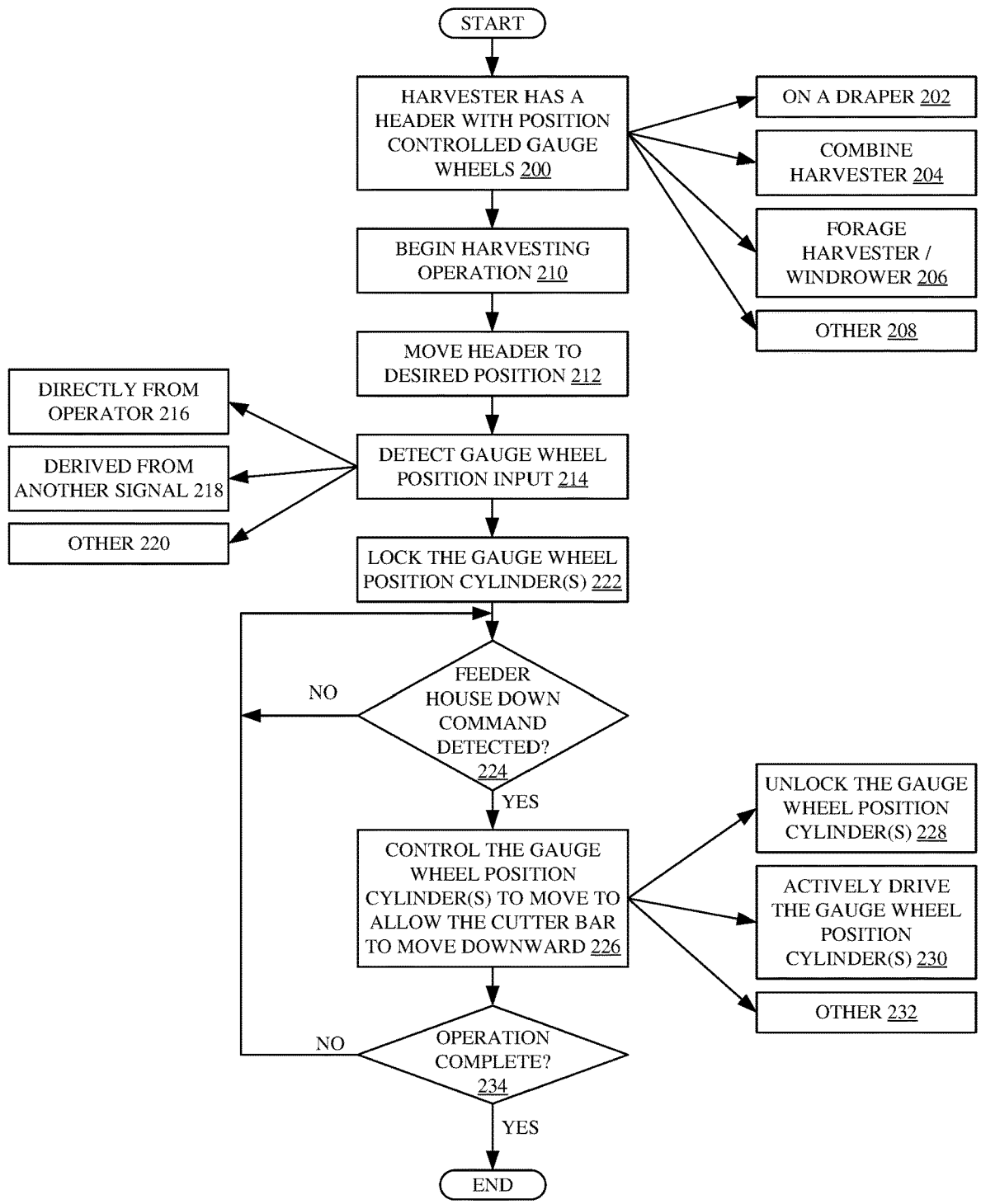
FIG. 4 is a flow diagram illustrating one example of the operation of the control system illustrated in FIG. 3.

FIG. 4 is a flow diagram illustrating one example of the operation of control system 168, in controlling actuator 164 based on feeder house movement, in more detail. FIG. 4 describes a scenario in which the feeder house move command is to move feeder house 107 down, but this is by way of example only.

It is first assumed that harvester 100 has a header 102 with position controlled gauge wheels 160. This is indicated by block 200 in the flow diagram of FIG. 4. The gauge wheels may be on a draper, as indicated by block 202, or another type of header. They may be on a combine harvester, as indicated by block 204, on a forage harvesters or windrower as indicated by block 206, or other machines, as indicated by block 208.

At some point, machine 100 will begin a harvesting operation. This is indicated by block 210. Operator 198 moves the header to a desired position, relative to ground. This is indicated by block 212.

Position input detector 186 then detects a gauge wheel position input indicating that the gauge wheels 160 are in a desired position, given the position of header 102. Detecting the gauge wheel position input is indicated by block 214 in the flow diagram of FIG. 4.

This can be detected based on a direct input from operator 198 indicating that the gauge wheels are in their desired position. This is indicated by block 216. It can also be derived from another signal or another set of signals. For instance, after the operator 198 has positioned header 102 at a desired position, and has then stopped moving the header, this may indicate that the gauge wheels are in a desired position. Deriving the gauge wheel position input from other signals is indicated by block 218 in the flow diagram of FIG. 4. The gauge wheel position input can be detected in a wide variety of other ways as well, and this indicated by block 220.

Position input detector 186 provides a signal indicative of this to cylinder locking logic 194. Cylinder locking logic 194 generates a control signal to lock cylinder 164 so that gauge wheel 160 is locked in its current position, relative to header mainframe 105. Locking the gauge wheel position cylinders is indicated by block 222 in the flow diagram of FIG. 4.

At some point, feeder house move command detector 188 detects an operator input from operator 198 indicating that the operator is actuating cylinder 111 to move feeder house 107 downwardly, relative to the ground. This may be, for example, in order to move cutter bar 104 closer to the ground to more effectively harvest downed crop. It may be for other reasons as well. Detecting the feeder house down command is indicated by block 224 in the flow diagram of FIG. 4.

Detector 188 then provides a signal indicative of the feeder house down command to cylinder retraction controller 192. Controller 192 generates a control signal and provides it to cylinder locking logic 194 to unlock cylinder 164 so that it can retract, thus allowing cutter bar 104 to move closer to the ground. Controlling the gauge wheel position cylinder 164 to move in order to allow the cutter bar to move downward is indicated by block 226 in the flow diagram of FIG. 4.

In one example, controller 192 controls cylinder locking logic 194 to simply unlock the gauge wheel position cylinder 164. Thus, it can retract under the weight of header 102 and any additional weight provided by the downward movement of feeder house 107. Unlocking the gauge wheel position cylinders 164 so that they can retract is indicated by block 228 in the flow diagram of FIG. 4.

In another example, cylinders 164 may be double acting cylinders so that, after they are unlocked by cylinder locking logic 194, cylinder retraction controller 192 can actively control cylinders 164 to retract. Actively driving the gauge wheel position cylinders 164 to retract is indicated by block 230. As discussed above, controller 192 can retract the cylinders at a predefined rate, or it can access extension/retraction correlations 174 in data store 172 and retract cylinders 164 at a rate which corresponds to the rate at which feeder house 107 is moving downwardly.

Cylinder retraction controller 192 can generate control signals so that gauge wheel position cylinder 164 retracts in other ways as well.

This is indicated by block 232. This type of gauge wheel position control continues until the harvesting operation is complete. This is indicated by block 234 in the flow diagram of FIG. 4.

It will also be noted that gauge wheel position cylinders 164 can be controlled by cylinder extension controller 190 to extend in response to movement of feeder house 107 upwardly. In that case, feeder house move command detector 188 detects a feeder house move command, input by operator 198 to move feeder house 107 upwardly. It provides an indication of this to cylinder extension controller 190. Cylinder extension controller 190, itself, controls cylinder locking logic 194 to unlock cylinder 164 and can then allow it to extend under the weight of gauge wheel 160, as feeder house 107 moves upwardly, or it can actively control cylinder 164 to extend. Again, it can do this at a fixed rate, or based on extension/retraction correlations 174.

The present discussion has mentioned processors and servers. In one example, the processors and servers include computer processors with associated memory and timing circuitry, not separately shown. They are functional parts of the systems or devices or logic to which they belong and are activated by, and facilitate the functionality of the other components or items or logic in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGS. show a number of blocks with functionality ascribed to each block. It will be noted that fewer blocks can be used so the functionality is performed by fewer components. Also, more blocks can be used with the functionality distributed among more components.

Figure 5:
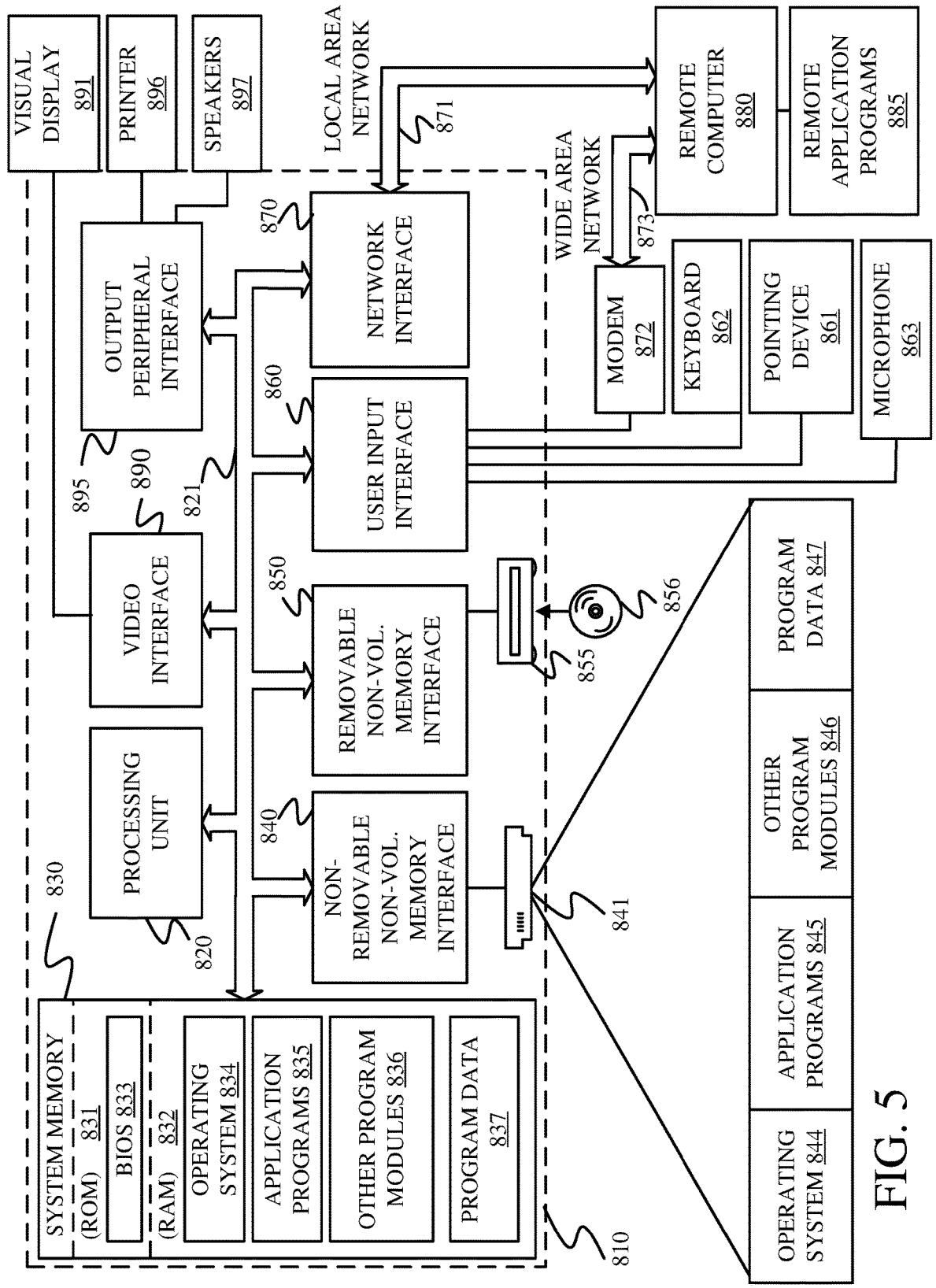
FIG. 5 is a block diagram showing one example of a computing environment that can be used to implement the control system.

FIG. 5 is one example of a computing environment in which elements of FIG. 3, or parts of it, (for example) can be deployed. With reference to FIG. 5, an example system for implementing some embodiments includes a computing device in the form of a computer 810. Components of computer 810 may include, but are not limited to, a processing unit 820 (which can comprise processor 170), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a control system for an agricultural harvester having a header connected to a feeder house, the control system comprising:

a position input detector detecting that a positioner arm that drives position of a ground engaging element relative to the header, and that is movable relative to the header by actuating a position actuator, is in a first position;

a feeder house move command detector that detects a feeder house down command commanding the feeder house to move downwardly relative to a frame of the agricultural harvester, and generates a feeder house down detected signal; and a position controller that generates a first control signal to control the position actuator to increase resistance to movement of the positioner arm in a first direction relative to the header and that generates a second control signal, in response to the feeder house down detected signal, that decreases the resistance to movement of the positioner arm in the first direction relative to the header.

Example 2 is the control system of any or all previous examples wherein the position controller generates the second control signal to control the position actuator to actively drive movement of the positioner arm in the first direction relative to the header.

Example 3 is the control system of any or all previous examples wherein the position controller generates the second control signal to control the position actuator to actively drive movement of the positioner arm in the first direction relative to the header at a rate corresponding to a rate at which the feeder house moves down in response to the feeder house down command.

Example 4 is the control system of any or all previous examples and further comprising:

a data store that stores a set of movement correlations indicative of correlations between rates at which the feeder house moves down and a rate of movement of the positioner arm in the first direction relative to the header.

Example 5 is the control system of any or all previous examples wherein the position controller accesses the set of retraction correlations and generates the second control signal to actively drive the positioner arm in the first direction relative to the header at a rate corresponding to a rate at which the feeder house moves down in response to the feeder house down command, based on the movement correlations.

Example 6 is the control system of any or all previous examples wherein the feeder house move command detector detects a feeder house up command commanding the feeder house to move upwardly relative to a frame of the agricultural harvester and generates a feeder house up detected signal.

Example 7 is the control system of any or all previous examples wherein the ground engaging element comprises a gauge wheel and wherein the position actuator comprises a gauge wheel position actuator and wherein the position controller generates the second control signal to unlock the gauge wheel position cylinder, to allow retraction thereof, based on the feeder house down detected signal.

Example 8 is the control system of any or all previous examples wherein the position controller comprises cylinder retraction logic that unlocks the gauge wheel position cylinder and actively drives the gauge wheel position cylinder to retract as the feeder house moves downwardly in response to the feeder house down command.

Example 9 is the control system of any or all previous examples wherein the position controller comprises:

cylinder extension logic that controls the gauge wheel position cylinder to allow the gauge wheel position cylinder to extend as the feeder house moves upwardly in response to the feeder house up command.

Example 10 is the control system of any or all previous examples wherein the cylinder extension logic generates a control signal to actively drive extension of the gauge wheel position cylinder.

Example 11 is an agricultural harvester, comprising:

a crop processing mechanism;

a header that severs crop and has a header mainframe;

a feeder house that feeds the severed crop from the header to the crop processing mechanism;

a ground engaging element movably coupled to the header;

a position actuator that is actuated to change the position of the ground engaging element relative to the header mainframe;

a position input detector detecting that the ground engaging element is in a first position;

a feeder house move command detector that detects a feeder house down command commanding the feeder house to move downwardly relative to a frame of the agricultural harvester, and generates a feeder house down detected signal; and a position controller that generates a first control signal to control the position actuator to inhibit upward movement of the ground engaging element relative to the header and that generates a second control signal, in response to the feeder house down detected signal, to control the position actuator to reduce resistance to upward movement of the ground engaging element relative to the header.

Example 12 is the agricultural harvester of any or all previous examples wherein the ground engaging element comprises a gauge wheel, wherein the position actuator comprises a gauge wheel position cylinder and wherein the position controller comprises:

cylinder locking logic that locks the gauge wheel position cylinder, inhibiting retraction of the gauge wheel position cylinder; and cylinder retraction logic that generates a control signal to control the cylinder locking logic to unlock the gauge wheel position cylinder based on the feeder house down detected signal.

Example 13 is the agricultural harvester of any or all previous examples wherein the cylinder retraction logic controls the cylinder locking logic to unlock the gauge wheel position cylinder to allow the gauge wheel position cylinder to retract as the feeder house moves downwardly in response to the feeder house down command.

Example 14 is the agricultural harvester of any or all previous examples wherein the cylinder retraction logic generates a control signal to actively drive retraction of the gauge wheel position cylinder.

Example 15 is the agricultural harvester of any or all previous examples wherein the cylinder retraction logic generates a control signal to actively drive retraction of the gauge wheel position cylinder at a rate corresponding to a rate at which the feeder house moves down in response to the feeder house down command.

Example 16 is the agricultural harvester of any or all previous examples wherein the cylinder retraction logic accesses a set of retraction correlations indicative of correlations between rates at which the feeder house moves down and a rate of retraction of the gauge wheel position sensor and generates a control signal to actively drive retraction of the gauge wheel position cylinder at a rate corresponding to a rate at which the feeder house moves down in response to the feeder house down command, based on the retraction correlations.

Example 17 is the agricultural harvester of any or all previous examples wherein the feeder house move command detector detects a feeder house up command commanding the feeder house to move upwardly relative to a frame of the agricultural harvester and generates a feeder house up detected signal.

Example 18 is the agricultural harvester of any or all previous examples and further comprising:

cylinder extension logic that generates a control signal to control the cylinder locking logic to unlock the gauge wheel position cylinder based on the feeder house down detected signal.

Example 19 is the agricultural harvester of any or all previous examples wherein the cylinder extension logic controls the cylinder locking logic to unlock the gauge wheel position cylinder to allow the gauge wheel position cylinder to extend as the feeder house moves upwardly in response to the feeder house up command.

Example 20 is a method of controlling an agricultural harvester having a header connected to a feeder house, the method comprising:

detecting that a gauge wheel on the header, that is movable relative to the header by actuating a gauge wheel position cylinder, is in a first position;

locking the gauge wheel position cylinder, inhibiting retraction of the gauge wheel position cylinder;

detecting a feeder house down command commanding the feeder house to move downwardly relative to a frame of the agricultural harvester;

generating a feeder house down detected signal; and generating a control signal to control the cylinder locking logic to unlock the gauge wheel position cylinder based on the feeder house down detected signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for an agricultural harvester having a header connected to a feeder house, the control system comprising:
    a position input detector detecting that a positioner arm that drives position of a ground engaging element relative to the header, and that is movable relative to the header by actuating a position actuator, is in a first position;
    a feeder house move command detector that detects a feeder house down command commanding the feeder house to move downwardly relative to a frame of the agricultural harvester, and generates a feeder house down detected signal; and
    a position controller that generates a first control signal to control the position actuator to increase resistance to movement of the positioner arm in a first direction relative to the header and that generates a second control signal, in response to the feeder house down detected signal, that decreases the resistance to movement of the positioner arm in the first direction relative to the header.

2. The control system of claim 1 wherein the position controller generates the second control signal to control the position actuator to actively drive movement of the positioner arm in the first direction relative to the header.

3. The control system of claim 2 wherein the position controller generates the second control signal to control the position actuator to actively drive movement of the positioner arm in the first direction relative to the header at a rate corresponding to a rate at which the feeder house moves down in response to the feeder house down command.

4. The control system of claim 3 and further comprising:
    a data store that stores a set of movement correlations indicative of correlations between rates at which the feeder house moves down and a rate of movement of the positioner arm in the first direction relative to the header.

5. The control system of claim 4 wherein the position controller accesses the set of retraction correlations and generates the second control signal to actively drive the positioner arm in the first direction relative to the header at a rate corresponding to a rate at which the feeder house moves down in response to the feeder house down command, based on the movement correlations.

6. The control system of claim 1 wherein the feeder house move command detector detects a feeder house up command commanding the feeder house to move upwardly relative to a frame of the agricultural harvester and generates a feeder house up detected signal.

7. The control system of claim 6 wherein the ground engaging element comprises a gauge wheel and wherein the position actuator comprises a gauge wheel position actuator and wherein the position controller generates the second control signal to unlock the gauge wheel position cylinder, to allow retraction thereof, based on the feeder house down detected signal.

8. The control system of claim 1 wherein the position controller comprises cylinder retraction logic that unlocks the gauge wheel position cylinder and actively drives the gauge wheel position cylinder to retract as the feeder house moves downwardly in response to the feeder house down command.

9. The control system of claim 8 wherein the position controller comprises:
    cylinder extension logic that controls the gauge wheel position cylinder to allow the gauge wheel position cylinder to extend as the feeder house moves upwardly in response to the feeder house up command.

10. The control system of claim 9 wherein the cylinder extension logic generates a control signal to actively drive extension of the gauge wheel position cylinder.

11. An agricultural harvester, comprising:
    a crop processing mechanism;
    a header that severs crop and has a header mainframe;
    a feeder house that feeds the severed crop from the header to the crop processing mechanism;
    a ground engaging element movably coupled to the header;
    a position actuator that is actuated to change the position of the ground engaging element relative to the header mainframe;
    a position input detector detecting that the ground engaging element is in a first position; a feeder house move command detector that detects a feeder house down command commanding the feeder house to move downwardly relative to a frame of the agricultural harvester, and generates a feeder house down detected signal; and
    a position controller that generates a first control signal to control the position actuator to inhibit upward movement of the ground engaging element relative to the header and that generates a second control signal, in response to the feeder house down detected signal, to control the position actuator to reduce resistance to upward movement of the ground engaging element relative to the header.

12. The agricultural harvester of claim 11 wherein the ground engaging element comprises a gauge wheel, wherein the position actuator comprises a gauge wheel position cylinder and wherein the position controller comprises:
    cylinder locking logic that locks the gauge wheel position cylinder, inhibiting retraction of the gauge wheel position cylinder; and
    cylinder retraction logic that generates a control signal to control the cylinder locking logic to unlock the gauge wheel position cylinder based on the feeder house down detected signal.

13. The agricultural harvester of claim 12 wherein the cylinder retraction logic controls the cylinder locking logic to unlock the gauge wheel position cylinder to allow the gauge wheel position cylinder to retract as the feeder house moves downwardly in response to the feeder house down command.

14. The agricultural harvester of claim 12 wherein the cylinder retraction logic generates a control signal to actively drive retraction of the gauge wheel position cylinder.

15. The agricultural harvester of claim 14 wherein the cylinder retraction logic generates a control signal to actively drive retraction of the gauge wheel position cylinder at a rate corresponding to a rate at which the feeder house moves down in response to the feeder house down command.

16. The agricultural harvester of claim 15 wherein the cylinder retraction logic accesses a set of retraction correlations indicative of correlations between rates at which the feeder house moves down and a rate of retraction of the gauge wheel position sensor and generates a control signal to actively drive retraction of the gauge wheel position cylinder at a rate corresponding to a rate at which the feeder house moves down in response to the feeder house down command, based on the retraction correlations.

17. The agricultural harvester of claim 12 wherein the feeder house move command detector detects a feeder house up command commanding the feeder house to move upwardly relative to a frame of the agricultural harvester and generates a feeder house up detected signal.

18. The agricultural harvester of claim 17 and further comprising:
    cylinder extension logic that generates a control signal to control the cylinder locking logic to unlock the gauge wheel position cylinder based on the feeder house down detected signal.

19. The agricultural harvester of claim 18 wherein the cylinder extension logic controls the cylinder locking logic to unlock the gauge wheel position cylinder to allow the gauge wheel position cylinder to extend as the feeder house moves upwardly in response to the feeder house up command.

* * * * *